(No Model.) 3 Sheets—Sheet 1.

J. B. LEAMON.
SEED PLANTER.

No. 395,153. Patented Dec. 25, 1888.

WITNESSES
F. L. Durand
A. L. Morsell

INVENTOR
John B. Leamon
by Louis Bagger & Co.
Attorneys.

(No Model.) 3 Sheets—Sheet 2.

J. B. LEAMON.
SEED PLANTER.

No. 395,153. Patented Dec. 25, 1888.

WITNESSES
F. L. Durand
A. L. Morsell

INVENTOR
John B. Leamon
by Louis Bagger & Co.
Attorneys (No Model.) 3 Sheets—Sheet 3.
J. B. LEAMON.
SEED PLANTER.
No. 395,153. Patented Dec. 25, 1888.
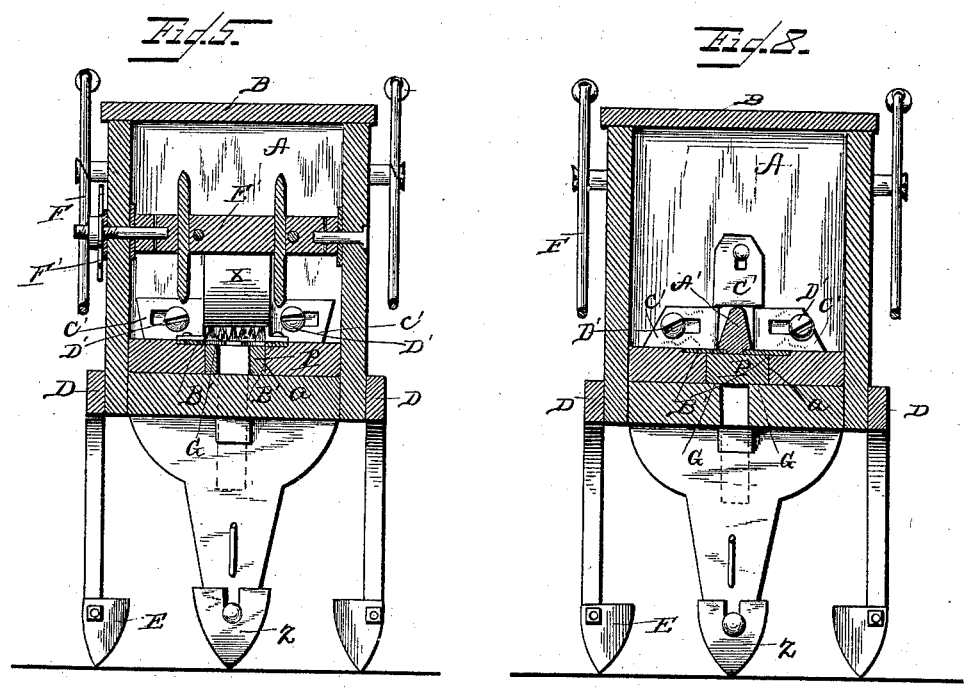
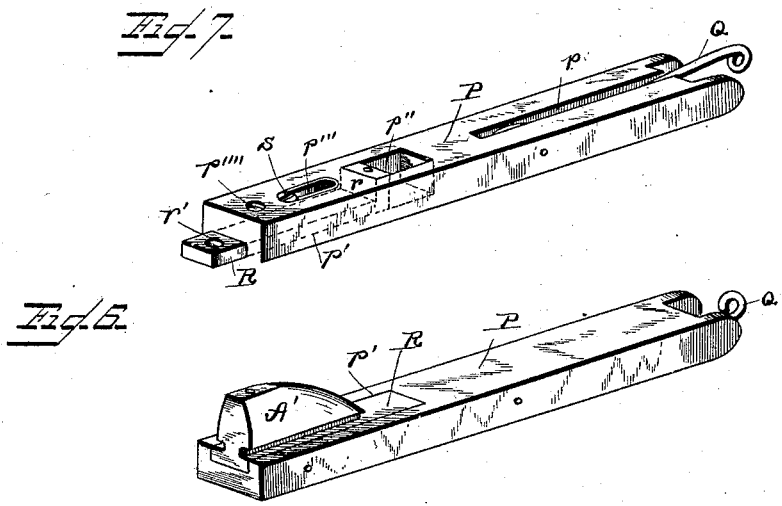
WITNESSES
F. L. Orrand
A. L. Morsell
INVENTOR
John B. Leamon
By Louis Bagger & Co.
Attorneys
N. PETERS, Photo-Lithographer, Washington, D. C.

UNITED STATES PATENT OFFICE.

JOHN B. LEAMON, OF FRANKLIN, TEXAS.

SEED-PLANTER.

SPECIFICATION forming part of Letters Patent No. 395,153, dated December 25, 1888.

Application filed April 2, 1888. Serial No. 269,372. (No model.)

*To all whom it may concern:*

Be it known that I, JOHN B. LEAMON, a citizen of the United States, and a resident of Franklin, in the county of Robertson and State of Texas, have invented certain new and useful Improvements in Seed-Planters; and I do hereby declare that the following is a full, clear, and exact description of the invention, which will enable others skilled in the art to which it appertains to make and use the same, reference being had to the accompanying drawings, which form a part of this specification, and in which—

Figure 1:
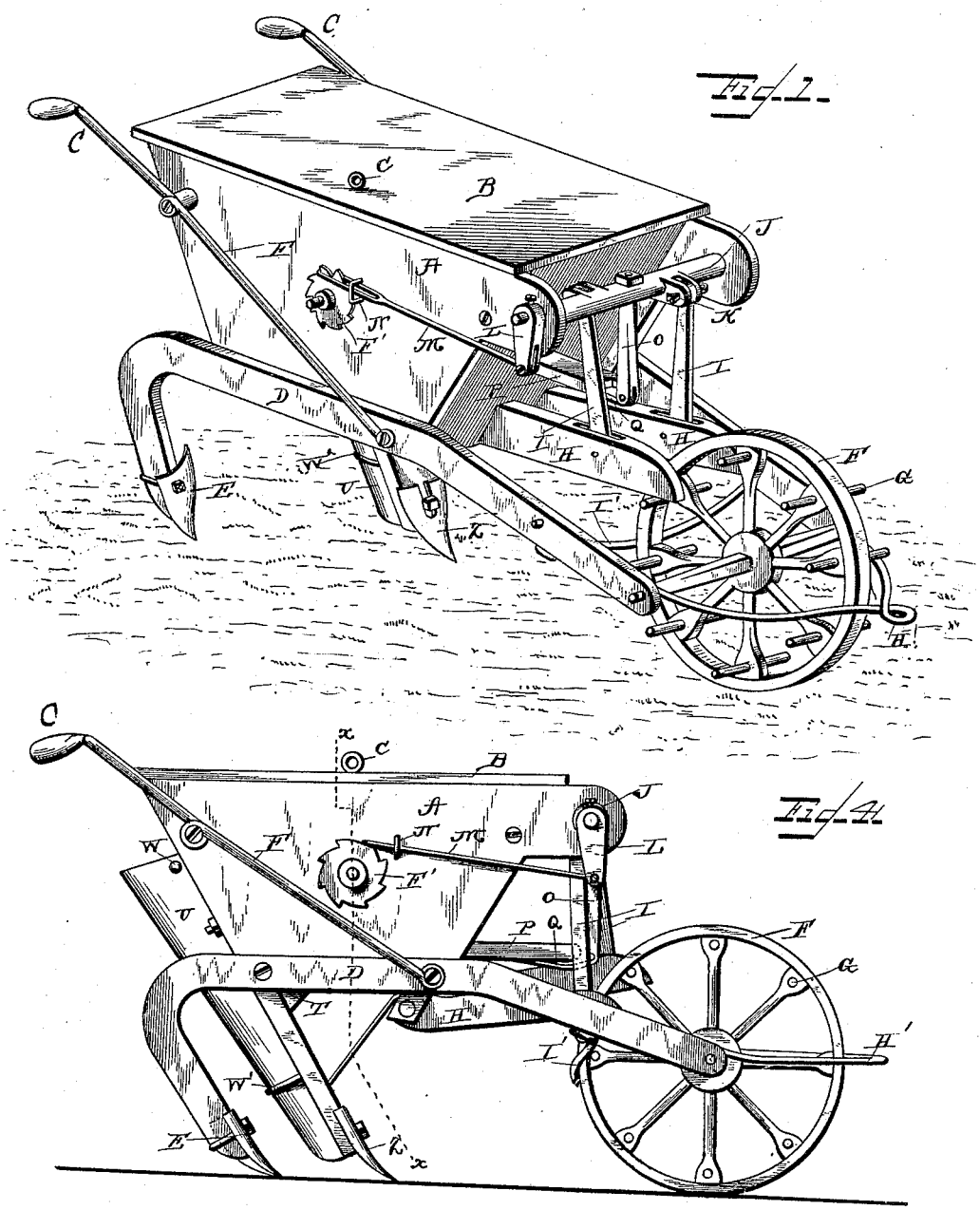
Figure 2:
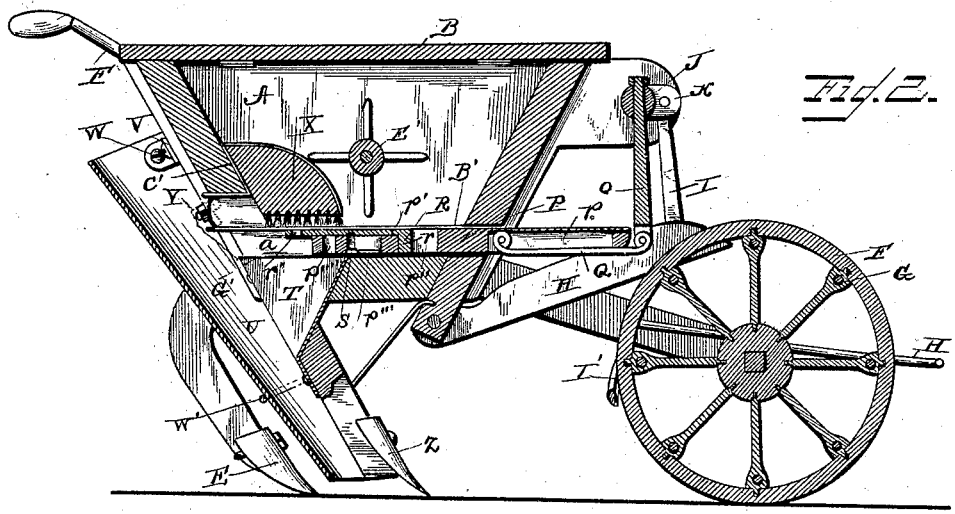
Figure 3:
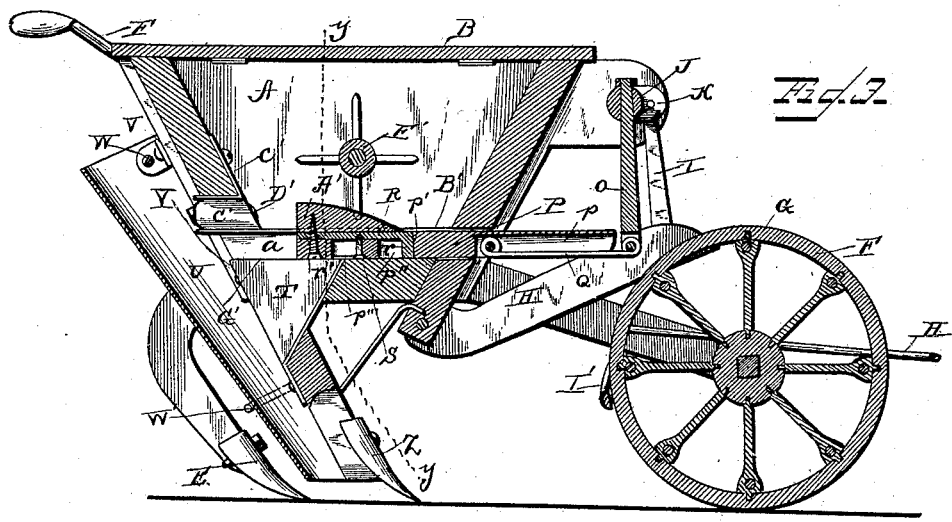

Figure 1 is a perspective view of my improved seed-planter. Fig. 2 is a longitudinal vertical sectional view with the slide adjusted for drilling corn and other smooth grain. Fig. 3 is a longitudinal vertical sectional view with my improved cotton-seed slide in position. Fig. 4 is a side elevation. Fig. 5 is a cross-sectional view taken through the agitator-shaft on the line $x$ $x$, Fig. 4. Fig. 6 is a detail perspective view of the seed-slide when used for drilling cotton. Fig. 7 is a detail perspective view of the under side of the seed-slide when used for corn and other smooth grain; and Fig. 8 is a cross-section through $y$ $y$, Fig. 3.

Like letters of reference indicate corresponding parts throughout the several figures.

My invention has relation to improvements in seed-planters, of such construction as to be adapted to be used for drilling seed at equidistances or in one continuous row, as preferred, and also in providing a machine of such construction whereby the same may be adapted for sowing various kinds of seeds or grains; and with these ends in view it consists in the improved construction and combination of parts of the same, as hereinafter more fully set forth.

Referring to the several parts by their designating letters of reference, the letter A represents the seed box or receptacle provided with the usual top or cover, B, having handle C. Suitably secured to the sides of the seed box or receptacle are the usual beams, D D, having their rear ends bent and provided with plow-points E E. Inclined handle-bars F F are also secured to these beams and extend to the rear of the machine, where they can be readily and conveniently reached by the operator.

Journaled between the front ends of the side beams, B B, is a wheel, F, having each of the spokes thereof provided with a perforation in the lower enlarged ends of the same, through which pass transverse bars G.

Pivoted in slots in the lower extended end of the front piece of the seed box or receptacle are two arms, H H, extending outwardly and in turn pivoted to rods or levers I I, which connect with a rocker-shaft, J, being pivoted in slotted ears or cranks K K on opposite sides of the rocker-shaft. This rocker-shaft is journaled between the extended ends of the side pieces of the seed receptacle or box, and is provided on one end thereof, on the outer side of the extended end of the side piece, with a downwardly-extending arm or pitman, L, said arm also connecting with a rod, M, having a loop in the end thereof passing through a guide or guard, N, in the side of the frame. The rocker-shaft J is further provided with a central downwardly-extending arm or connecting-pitman, O.

The seed-slide of my improved device is designated by the letter P, and works in a groove, $a$, in the bottom of the seed receptacle or box, said slide being provided on its under side with a longitudinal groove, $p$, in which one end of a wire rod, Q, is secured, said rod extending out a slight distance beyond the bifurcated end of the slide, forming at this point a loop which enters between the lips of the bifurcated end of the arm or connecting-pitman O. The slide P is also provided on its upper face with a groove, $p'$, into which fits a plate, R, provided on its inner end with a downwardly-projecting stop or lug, $r$, which enters a slot, $p''$, in slide P. Passing through a second longitudinal slot, $p'''$, from the under face of the slide is a screw, S, by means of which the adjustability of the plate R is regulated, the slot being provided with an inner collar against which the head of the screw is driven, so as to secure the plate in its adjusted position. By this means the width of the slot $p''$ is regulated and the amount of grain desired to be dropped controlled.

The groove $a$ in the bottom of the seed receptacle or box terminates to the rear of the machine in a chute or incline, T, which communicates with a seed-spout, U. This seed-spout is secured at its upper end to the rear piece of the frame by means of an angular bracket, V, through which passes a transverse bolt, W, and at its lower end is encircled by a wire loop, W', by which means the same can be readily detached from the device when necessary.

A brush, X, is secured by screws or their equivalents to the bottom of the seed box or receptacle, one end of said brush being inclined so as to fit snugly against the rear end piece of the box or receptacle. This brush regulates the quantity of corn or other grain which is dropped at each reciprocation of the seed-slide, the corn or grain filling the slot in said slide, the brush throwing back any surplus which would tend to be carried thereby.

The rear end piece of the seed box or receptacle is provided with a longitudinal slot, Y, and has also an extended lower end, which forms a plow-beam, said beam carrying an adjustable plowshare or blade, Z, whereby the depth of the furrow may be regulated. This form of my device is especially applicable for drilling corn, beans, peas, and other smooth grain. In Figs. 3 and 6, however, I have shown a modification which will enable me to employ my improved device as a cotton-seed planter. To accomplish this the plate R is provided on its end with a perforation, $r'$, which, when said plate is pushed inward, registers with a similar perforation, $p''''$, in the end of the slide P. A curvilinear wedge-shaped shoulder or lug, A', is then attached to the upper face of the slide P, said shoulder or lug being provided with lower flanges or under-cuts, which rest upon metallic strips B' B', secured to the bottom of seed-receptacle and running the length thereof, forming guides for the slide and also for said shoulder or lug.

A series of adjustable slotted plates, C' C' C', are arranged in the rear of the seed-box, said plates being adjustable by means of screws D' D' D', or their equivalents, working in said slots, whereby the size of the opening above the incline or chute is regulated.

When used as a cotton-planter, the device is provided with a transverse shaft, E', journaled in the sides of the seed-box, having inner radial teeth or projections, and provided on the outer end thereof with a toothed wheel, F', which engages the loop in the end of the pivoted side arm or rod M, so that at each forward movement of the rod M, actuated by the rocker-shaft J, the toothed wheel is given a part turn, carrying with it the shaft to which it is rigidly secured, and on the back movement the loop will engage the next tooth of the wheel, and so on, so that at each actuation of the rocker-shaft the toothed wheel will be given a part turn. By this means a thorough agitation of the cotton-seed is attained and prevented from clogging, which it has a tendency to do, owing to its fibrous nature. It is evident that this agitator-shaft is preferably used only when the device is employed as a cotton-planter; but it may still, if desired, be employed when the device is used as a corn-planter, &c., though the same necessity which suggests its employment in a cotton-planter is not present, it only being retained in order to obviate the necessity and trouble of removing the same, as it will not at all detract from the successful operation of the machine when used for other purposes than planting cotton-seed.

This being the construction of my improved seed-planter, the operation of the same is as follows: When used as a corn, bean, or pea planter, and the like, the plate R is first adjusted so as to regulate the width of the slot in which the seed are carried to the inclined chute, the brush being in proper position in the rear of the frame. By next providing the wheel F with any suitable number of cross-bars (in the drawings I have shown eight) these bars will, when the machine is drawn over the field, engage the outwardly-extending arms H H, which impart motion to their connecting-arms I I, said arms in turn actuating the rocker-shaft J. As the arm O, which extends from the center of the rocker-shaft, engages the connecting-arm of the slide P, a reciprocating motion is given to said seed-slide, as well as to the rod which engages the toothed wheel when the same is employed. It is evident that the greater the number of cross-bars employed in wheel F the more rapid will be the reciprocating movement of the slide. In this manner the dropping of the seed is regulated, so that they may be deposited at equidistances. For instance, by removing all the pins but one the machine will drop once in every revolution of the wheel; then by employing another pin the machine is made to deposit the seed twice in every revolution of the wheel, and so on.

When it is desired to employ the machine as a cotton-planter, the rod of the slide P is first released from the downwardly-extending arm O by removing the screw connecting the same. The seed-tube is next removed, the same being readily effected by withdrawing the bolt which passes through the perforations in the upper bracket. The brush is then unscrewed from the bottom of the seed receptacle or box. The seed-slide can then be easily withdrawn at the rear of the machine. This being done, the plate R is pushed in and the curvilinear wedge-shaped shoulder or lug A' properly adjusted. The slide is now reinserted in the seed receptacle or box and is ready for operation. The device is now operated in exactly the same manner as when used for a corn-planter, with the addition, as previously stated, of the employment of the agitator-shaft carrying radial forks or teeth for stirring or agitating the cotton and preventing the same from clogging. In practice when the curvilinear wedge-shaped shoulder or lug is employed for this purpose, there should be several different sizes in readiness, so that the quantity of cotton desired to be planted may be regulated. The adjustable plates can also be adjusted to accommodate themselves to the size of the shoulder or lug employed. It is also observed that the metallic strips B' B' toward the rear portion of the machine are made somewhat wider, forming ways for the under-cuts or flanges of the shoulder or lug. This shoulder or lug pushes or forces the seed to the opening in the rear of the machine, and finally into the seed-tube, from where it enters the furrow made by the plow-points Z upon the end of the extended portion of the rear piece of the frame, and this furrow is covered with earth by the plow-points E E upon the ends of the side bars, said plow-points being bent rearward, so as to deflect the earth.

If the device is desired to be used as a fertilizer, it can be readily adapted for that purpose by simply employing a slide of a larger size than used for other purposes.

In practice any other means for actuating the slide can be substituted for the means employed by me; but I prefer to adopt the construction herein shown and described, having found the same to work much more satisfactory than any other mechanism for the same purpose.

It will be seen that above the incline or chute T are ways or flanges G' G', to support the seed-slide at this point, so that these, in connection with the metallic strips above the same, will serve to retain the slide securely in position.

The letter H' represents the usual bow to which the team is attached, which is secured to the beams in any desired manner. To the rear of the wheel I also provide a curved bar, I', which answers the twofold purpose of bracing the beams and also scraping off any dirt or mud which may adhere to the periphery of the wheel.

From the foregoing, taken in connection with the accompanying drawings, the operation, construction, and advantages of my improved seed-drill will be readily understood without requiring further explanation.

Having thus described my invention, I claim and desire to secure by Letters Patent of the United States—

1. In a seed-planter, the combination of the seed receptacle or box, the outwardly-extending arms pivoted to the forward end of said seed receptacle or box, the connecting-arms or pitmen, the rocker-shaft having central arms, the seed-slide provided with a pivoted arm connected to said central arm of the rocker-shaft, and the wheel provided with transverse pins.

2. In a seed-planter, the combination, with the seed-receptacle having longitudinal slot in the lower part thereof, the seed-slide having two slots in its rear end of varying sizes, and also provided on its extreme end with a perforation, the plate provided on one end with a downwardly-extending lug or stop and on its opposite end with a perforation registering with the perforation in the end of the seed-slide, the screw for adjusting the plate, and the curvilinear wedge-shaped shoulder or lug.

3. In a seed-planter, the combination of the seed-receptacle having longitudinal slot through the lower part thereof, said slot terminating in its rear end in an incline or chute, provided with ways or flanges above said chute, the seed-spout, the slide, means for actuating the same, the metallic strips, and the adjustable slotted plates.

4. In a seed-planter, the combination of the seed-receptacle having longitudinal slot through the lower part thereof, said slot terminating in its rear end in an incline or chute, and having ways or flanges above said chute, the seed-spout, the slide, means for actuating the same, the curvilinear wedge-shaped shoulder or lug secured to said seed-slide and provided with flanges or under-cuts, and the metallic strips having enlarged rear ends.

In testimony that I claim the foregoing as my own I have hereunto affixed my signature in presence of two witnesses.

JOHN B. LEAMON.

Witnesses:
T. J. SIMMONS,
N. C. LEAMON.